(12) United States Patent
Imanishi et al.

(10) Patent No.: US 9,108,681 B2
(45) Date of Patent: Aug. 18, 2015

(54) SUB-FRAME FOR VEHICLE

(71) Applicants: HONDA MOTOR CO., LTD., Minato-Ku, Tokyo (JP); YANAGAWA SEIKI CO., LTD., Fuchu-Shi, Tokyo (JP)

(72) Inventors: Tomoyuki Imanishi, Wako (JP); Nobuyuki Okabe, Fuchu (JP)

(73) Assignees: Honda Motor Co., Ltd., Tokyo (JP); Yanagawa Seiki Co., Ltd., Tokyo (JP)

( * ) Notice: Subject to any disclaimer, the term of this patent is extended or adjusted under 35 U.S.C. 154(b) by 0 days.

(21) Appl. No.: 14/484,844

(22) Filed: Sep. 12, 2014

(65) Prior Publication Data

US 2015/0076805 A1  Mar. 19, 2015

(30) Foreign Application Priority Data

Sep. 13, 2013 (JP) ................ 2013-190711

(51) Int. Cl.
| | |
|---|---|
| *B62D 21/11* | (2006.01) |
| *B22C 9/24* | (2006.01) |
| *B62D 29/00* | (2006.01) |
| *B62D 21/15* | (2006.01) |
| *B22D 17/22* | (2006.01) |
| *B22D 25/02* | (2006.01) |

(52) U.S. Cl.
CPC .............. *B62D 21/11* (2013.01); *B22D 17/22* (2013.01); *B22D 25/02* (2013.01); *B62D 21/155* (2013.01); *B62D 29/008* (2013.01); *B60G 2204/15* (2013.01); *B60G 2206/60* (2013.01); *Y10T 29/49622* (2015.01)

(58) Field of Classification Search
CPC .... B62D 21/155; B62D 21/152; B62D 21/15; B62D 21/11; B62D 21/00; B62D 29/008; B62D 29/00; B22D 17/22; B22D 25/02; B60G 2204/15; B60G 2206/60; B60G 2206/601; B60G 2206/602; B60G 2206/604; B60G 2206/605; B60G 2206/606; B60G 2206/81012; B60G 2206/8101; Y10T 29/49622; Y10T 29/49616; Y10T 29/49988
USPC .................. 280/124.109, 781; 180/312, 311; 296/204, 203.02, 203.01, 187.08, 296/187.09; 29/897.2, 527.5
See application file for complete search history.

(56) References Cited

U.S. PATENT DOCUMENTS

| | | | | |
|---|---|---|---|---|
| 2003/0080587 | A1* | 5/2003 | Kitagawa ....................... | 296/194 |
| 2006/0284449 | A1* | 12/2006 | Miyahara ....................... | 296/204 |
| 2008/0265626 | A1* | 10/2008 | Dorr et al. ...................... | 296/204 |
| 2009/0212548 | A1* | 8/2009 | Frasch et al. .................. | 280/785 |
| 2013/0249250 | A1* | 9/2013 | Ohhama et al. ............... | 296/204 |
| 2014/0312655 | A1* | 10/2014 | Takahashi et al. ............ | 296/204 |

FOREIGN PATENT DOCUMENTS

| | | | | |
|---|---|---|---|---|
| JP | 03284496 A | * | 12/1991 | ............. B62K 25/10 |
| JP | 2012-136195 A | | 7/2012 | |

* cited by examiner

*Primary Examiner* — Keith Frisby
(74) *Attorney, Agent, or Firm* — Carrier Blackman & Associates, P.C.; Joseph P. Carrier; William D. Blackman

(57) ABSTRACT

A vehicle sub-frame includes a hollow body having a hollow part thereinside formed by casting using a core. The hollow body includes a front wall and a rear wall. The front wall has a front bulging section formed to bulge outward at a position corresponding to a parting line. The front bulging section is formed on a part avoiding a top wall and a bottom wall of the hollow body. The rear wall has a rear bulging section formed to bulge outward at a position corresponding to the parting line. The rear wall is formed on a part avoiding the top wall and the bottom wall.

6 Claims, 11 Drawing Sheets

SUB-FRAME FOR VEHICLE

FIELD OF THE INVENTION

The present invention relates to a die-cast vehicle sub-frame including a hollow body having a hollow part thereinside formed by casting using a core, and suspension support parts formed at left and right ends of the hollow body.

BACKGROUND OF THE INVENTION

Vehicles are known which include a die-cast sub-frame mounted rearward of a power plant (engine/transmission unit), and left and right suspension arms supported at left and right ends of the sub-frame. The sub-frame includes a hollow body having a hollow part thereinside formed by using a core, a front wall inclined upwardly toward the rear of a vehicle body, and a rear wall inclined upwardly toward a front of the vehicle body. Such a vehicle sub-frame is disclosed, for example, in Japanese Patent Application Laid-Open Publication (JP-A) No. 2012-136195.

In the sub-frame disclosed in JP 2012-136195A, since the front wall is inclined upwardly toward the rear of the vehicle body and the rear wall is inclined upwardly toward the front of the vehicle body, the sub-frame has a substantially trapezoidal shape in vertical cross section with a position where a fixed die and a movable die for casting meet together, i.e. a parting line position, being located at a bottom part of the sub-frame.

It is preferred that the sub-frame has a constant thickness so as to suppress an increase in weight. To form the sub-frame with the constant thickness, it is required that a core used to form a hollow part inside the sub-frame has a substantially trapezoidal shape in vertical cross section. The core is formed by solidifying casting sand with a binder. When the core is formed in the substantially trapezoidal shape in vertical cross section, the core has acute angle parts. The acute angle parts are fragile, and thus it is difficult to secure strength of the core.

To solve this problem, it is possible that the core is formed in a substantially hexagonal shape in vertical cross section with the acute angle parts being removed to thereby secure strength of the core. However, the sub-frame has the substantially trapezoidal shape in vertical cross section. If the core having the substantially hexagonal shape in vertical cross section is used, the sub-frame has parts thicker than other parts, and it becomes difficult to suppress the increase in weight of the sub-frame.

It is therefore an object of the present invention to provide a die-cast vehicle sub-frame which is capable of suppressing an increase in weight of the sub-frame itself while securing strength of a casting core.

SUMMARY OF THE INVENTION

According to the present invention, there is provided a vehicle sub-frame comprising: a hollow body extending in a vehicle width direction and having a hollow part thereinside formed by casting using a core; and left and right suspension support parts formed integrally with left and right ends of the hollow body, respectively, for connection with suspension arms, wherein the hollow body includes a front wall located on a front side in a vehicle body, and a rear wall located rearward of the front wall, wherein the front wall and the rear wall have respective bulging sections each formed to bulge outward at a position corresponding to a parting line formed in casting of the sub-frame, and wherein each of the bulging sections is located on a part avoiding a top part of the hollow body and a bottom part of the hollow body.

With this arrangement, since the front wall and the rear wall of the hollow body have the bulging sections formed to bulge outward, inner faces of the bulging sections are recessed outward. Furthermore, since the bulging sections are located on the parts avoiding the top part and the bottom part of the hollow body, the outward recessed inner faces of the bulging sections are also located away from the top part and the bottom part of the hollow body. Therefore, the core can have core bulging sections formed to bulge outward on a surface thereof at positions corresponding to the outward recessed inner faces of the bulging sections. The core can thus be formed in a shape with no acute angle parts in vertical cross section, thereby securing strength of the core. Further, by forming the inner faces of the bulging sections to be recessed outward, the front wall and the rear wall of the hollow body each have a constant thickness. By thus forming the front wall and the rear wall with the constant thickness, an increase in weight of the hollow body (i.e., sub-frame) can be suppressed.

Preferably, the core has core bulging sections located at positions corresponding to the bulging sections and formed to bulge outward. In this configuration, the core bulging sections are located away from a top surface and a bottom surface of the core. The core can thus be formed in the shape with no acute angle parts in vertical cross section, thereby securing strength of the core. Further, with the core bulging sections formed at the positions corresponding to the bulging sections, the front wall and the rear wall of the hollow body can be formed to have the constant thickness. By thus forming the front wall and the rear wall with the constant thicknesses, the increase in weight of the hollow body (i.e., sub-frame) can be suppressed.

Preferably, a trace of the parting line is formed on the sub-frame during casting of the sub-frame, the parting line being designed so that flows of molten metal injected from a first parting line section corresponding to one of the front and rear walls reach a second parting line segment corresponding to the other one of the front and rear walls at the same time. With this configuration, it is possible to prevent a backflow of the molten metal, injected from the first parting line section, from the second parting line section. By thus preventing the backflow of the molten metal, the sub-frame can be prevented from containing impurities, thereby improving quality of the sub-frame.

DESCRIPTION OF THE PREFERRED EMBODIMENT

Figure 1:
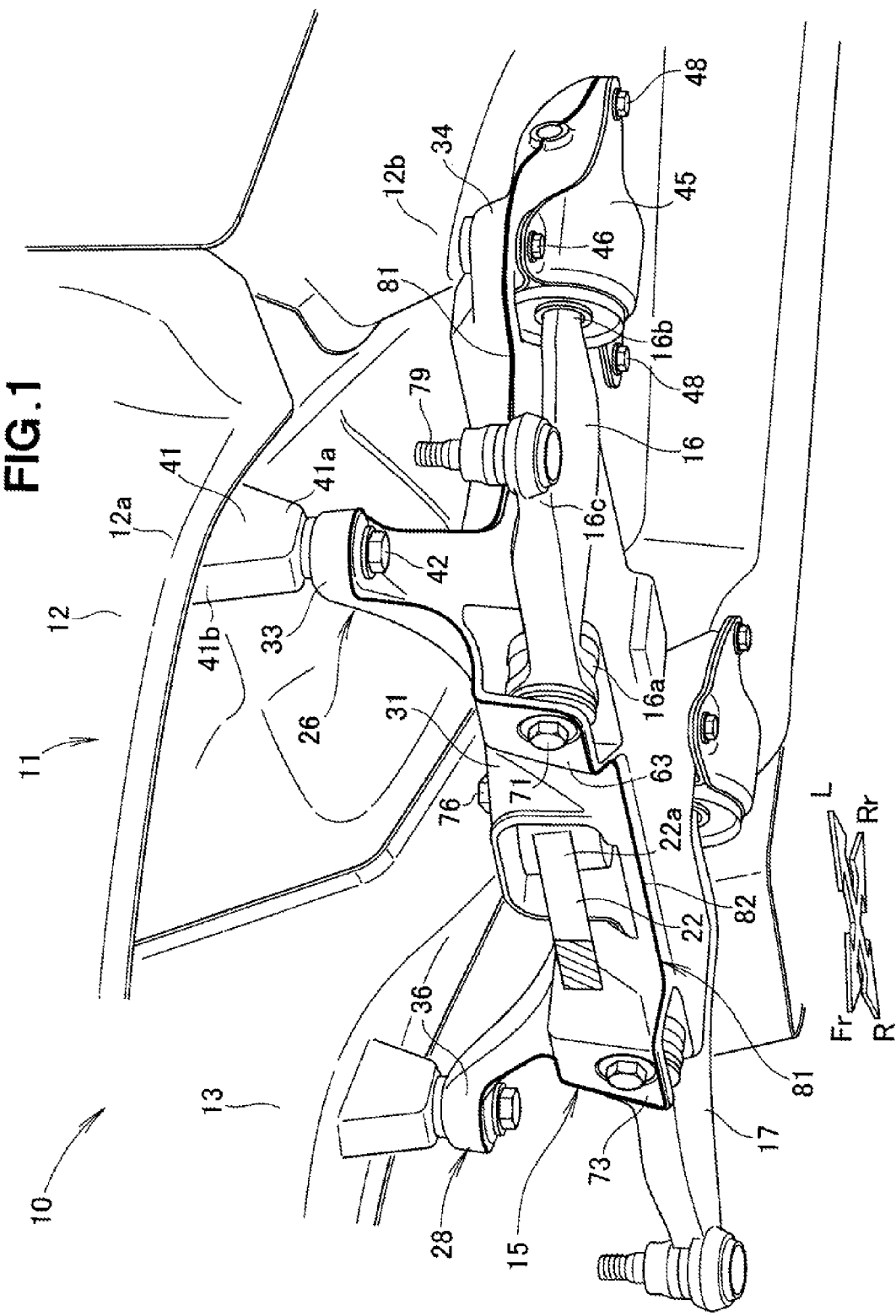
FIG. 1 is a perspective view of a vehicle front structure including a sub-frame according to the present invention as viewed from a lower front side thereof.

A certain preferred embodiment of the present invention will be described in detail below, by way of example only, with reference to the accompanying drawings. In the drawings, the terms "front (Fr)". "rear (Rr)", "left (L)" and "right (R)" are used to refer to directions as viewed from a driver in a vehicle.

Figure 2:
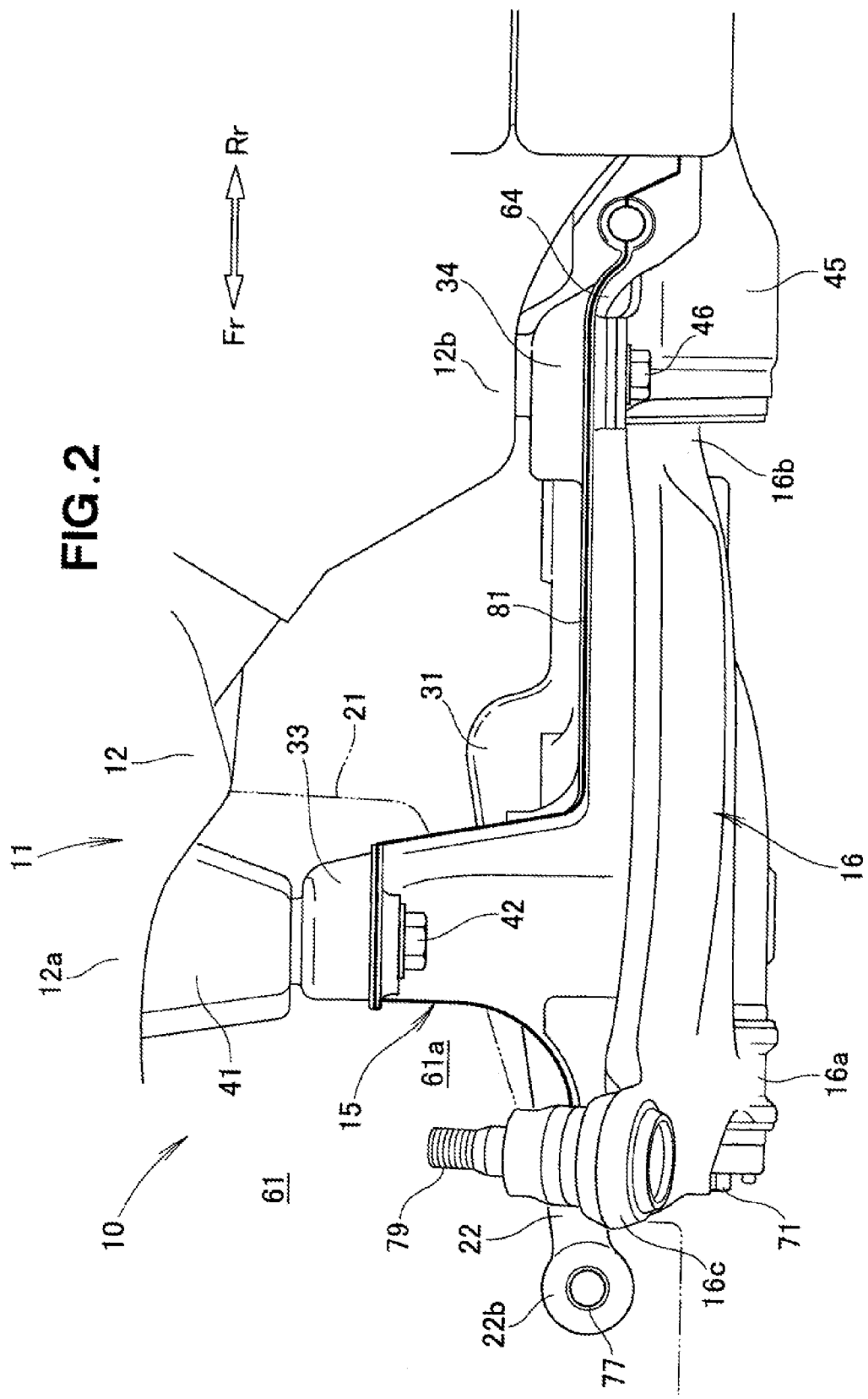
FIG. 2 is a side view of the vehicle front structure of FIG. 1.

First will be described a vehicle sub-frame 15 according to the embodiment. As shown in FIGS. 1 and 2, a vehicle front structure 10 includes left and right side frames 12, 13 extending in a vehicle longitudinal or front-rear direction, a sub-frame 15 mounted below the left and right side frames 12, 13, left and right suspension arms 16, 17 respectively connected to left and right ends of the sub-frame 15, and left and right front wheels 18, 19 (FIG. 4) respectively connected to the left and right suspension arms 16, 17.

The vehicle front structure 10 further includes a power plant 21 (FIG. 2) disposed forward of the sub-frame 15, and a torque rod 22 that connects the power plant 21 and the sub-frame 15. Since the vehicle front structure 10 and the sub-frame 15 each have a substantially bilaterally symmetrical structure, parts and sections on the left side will be described hereinbelow, and a detailed description of those on the right side will be omitted.

The left and right side frames 12, 13 constitute part of a front skeleton of a vehicle body 11. The power plant 21 (FIG. 2) is, for example, an engine/transmission unit including an engine and a transmission integrated with each other, and disposed horizontally between the left and right side frames 12, 13. The power plant 21 has a left side part connected to the left side frame 12 via a left mounting bracket (not shown), and a right side part connected to the right side frame 13 via a right mounting bracket (not shown).

Figure 3:
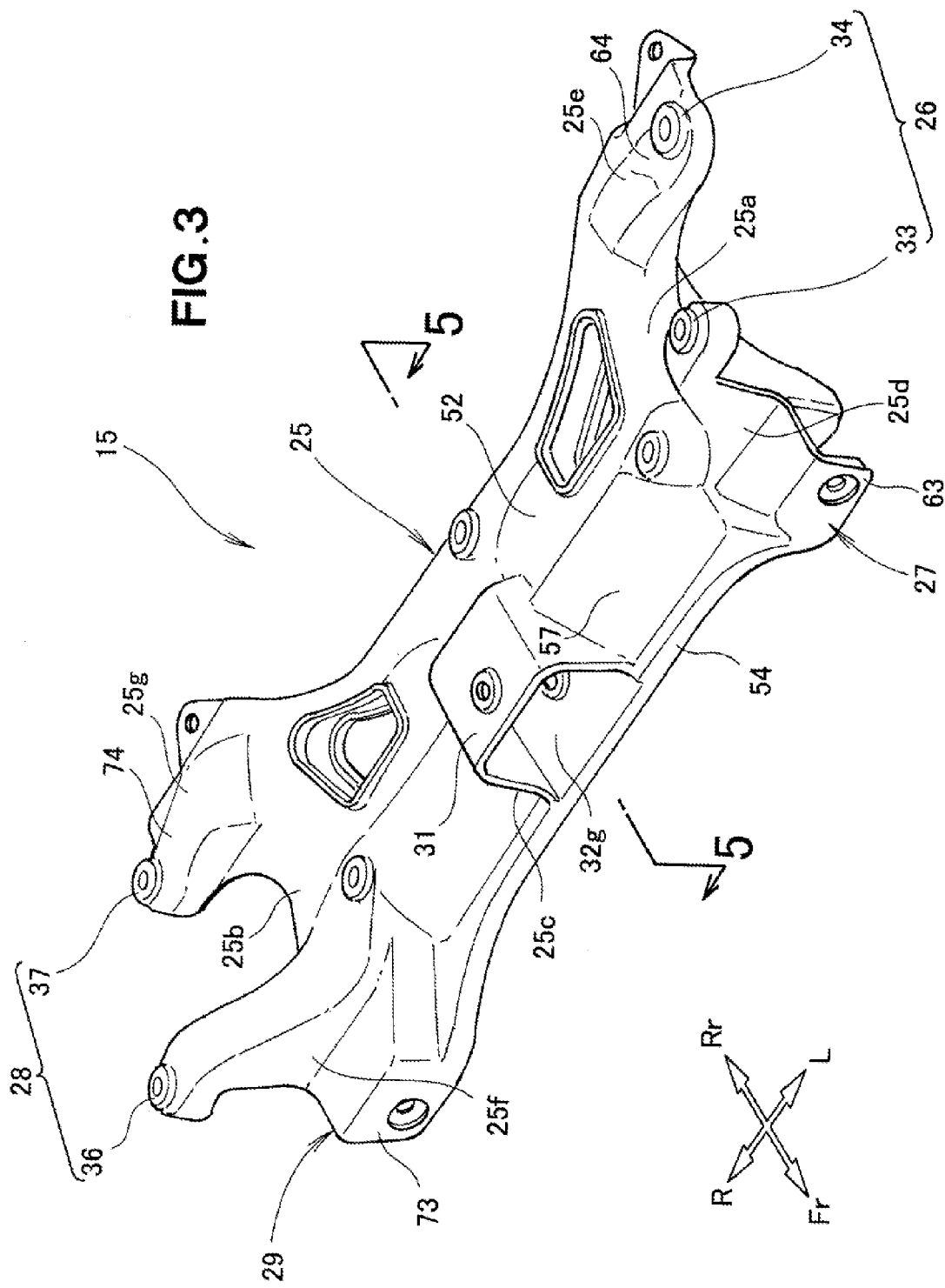
FIG. 3 is a perspective view of the sub-frame according to the present invention.

As shown in FIG. 3, the sub-frame 15 is made of aluminum alloy, for example, and has a hollow shape which is formed by using a core when the sub-frame 15 is manufactured as a single member by high-pressure die casting. The sub-frame 15 includes a hollow body 25 formed in the hollow shape by casting using the core, a left vehicle-body mounting part 26 and a left suspension support part 27 formed at a left end 25a of the hollow body 25, a right vehicle-body mounting part 28 and a right suspension support part 29 formed at a right end 25b of the hollow body 25, and a central connection part 31 formed at a front central section 25c of the hollow body 25.

The left vehicle-body mounting part 26 includes a left front mounting portion 33 integrally formed at a front section 25d of the left end 25a of the hollow body 25, and a left rear mounting portion (mounting portion) 34 integrally formed at a rear section 25e of the left end 25a of the hollow body 25. Likewise the left vehicle-body mounting part 26, the right vehicle-body mounting part 28 includes a right front mounting portion 36 integrally formed at a front section 25f of the right end 25b of the hollow body 25, and a right rear mounting portion (mounting portion) 37 integrally formed at a rear section 25g of the right end 25b of the hollow body 25.

Figure 4:
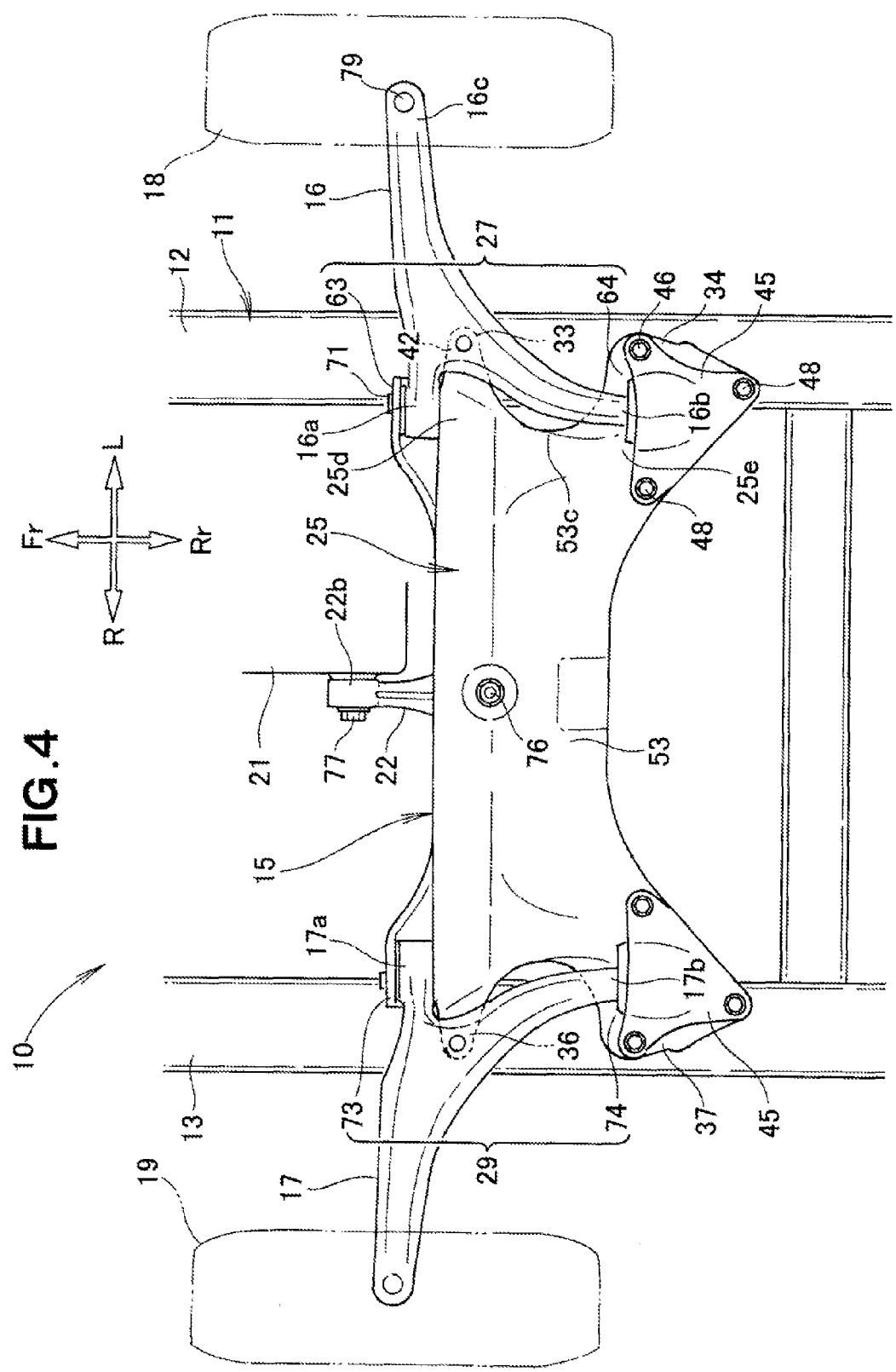
FIG. 4 is a bottom view of the vehicle front structure of FIG. 1.

As shown in FIGS. 1 and 4, the left front mounting portion 33 is fixedly joined to a lower end 41a of a left front leg 41 via a bolt 42 and a nut. An upper end 41b of the left front leg 41 is joined to a front attachment section 12a of the left side frame 12. The left rear mounting portion 34 is fixedly joined to a rear attachment section 12b of the left side frame 12 together with a left rear attachment cover 45 via a bolt 46 and a nut.

The right front mounting portion 36 and the right rear mounting portion 37 of the right vehicle-body mounting part 28 are fixedly joined to the right side frame 13, in the same manner as the left front mounting portion 33 and the left rear mounting portion 34. In this manner, the left front mounting portion 33 and the left rear mounting portion 34 are joined to the left side frame 12, and the right front mounting portion 36 and the right rear mounting portion 37 are joined to the right side frame 13, whereby the sub-frame 15 is joined to the left side frame 12 and the right side frame 13.

Figure 5:
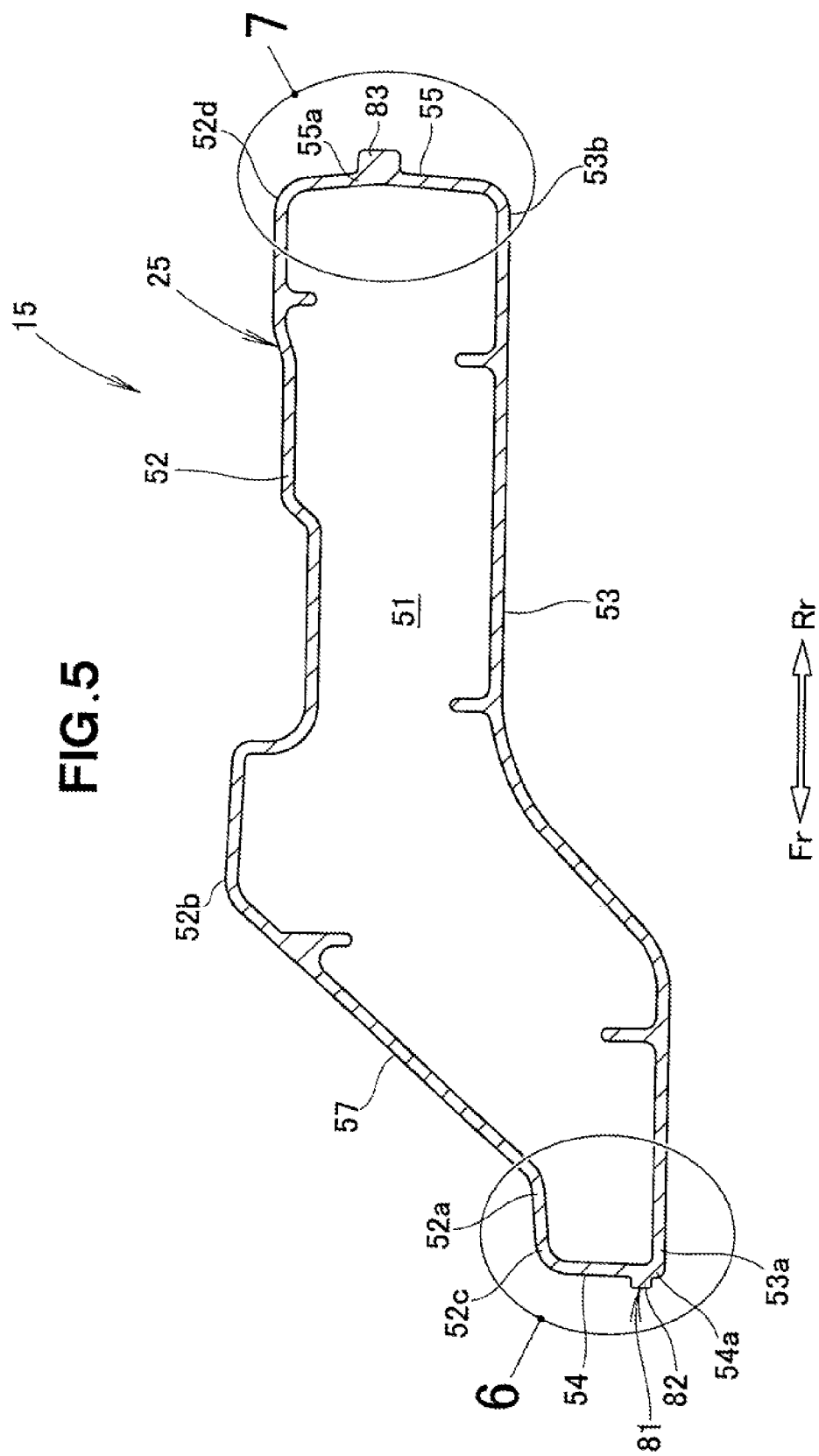
FIG. 5 is a cross-sectional view taken along line 5-5 of FIG. 3.

As shown in FIGS. 3 and 5, the hollow body 25 of the sub-frame 15 is arranged to extend in a vehicle width direction. The hollow body 25 has a hollow part 51 thereinside which is formed by using a core 95 (FIG. 8) when the sub-frame 15 is manufactured as a single member by high-pressure die casting. The hollow body 25 includes a top wall 52 facing upward, a bottom wall 53 facing downward, a front wall 54 connecting front ends 52c, 53a of the top wall 52 and the bottom wall 53, and a rear wall 55 connecting rear ends 52d, 53b of the top wall 52 and the bottom wall 53. The hollow part 51 of the hollow body 25 is formed by the top wall 52, the bottom wall 53, the front wall 54, and the rear wall 55.

The top wall 52 has a front upper inclined part 57 forming a part between a front end 52a and a middle section 52b (i.e., front part of the top wall 52). The front upper inclined part 57 is formed to extend upwardly toward the rear of the vehicle body, from the front end 52a to the middle section 52b. With the front upper inclined part 57 formed at the front part of the top wall 52, bulging amount of the sub-frame 15 in a direction obliquely forward and upward is reduced. A large front upper space 61a within an engine room 61 is thereby secured on a front upper side of the sub-frame 15 so that the power plant 21 can be housed within the engine room 61. The hollow body 25 will be detailed later.

As shown in FIGS. 3 and 4, the left suspension support part 27 includes a left front connection portion 63 formed integrally with the front section 25d of the left end 25a of the hollow body 25, and a left rear connection portion 64 formed integrally with the rear section 25e of the left end 25a of the hollow body 25.

The left front connection portion 63 is formed to project forward from the front section 25d, and located forward of the left front mounting portion 33 and leftward (outward in the vehicle width direction) of the front upper inclined part 57. A front mounting part 16a of the left suspension arm 16 is inserted inside the left front connection portion 63 from outside in the vehicle width direction, and the front mounting part 16a is fixedly connected to the left front connection portion 63 via a left front supporting bolt 71 (see also FIG. 1).

The left rear connection portion 64 is formed adjacent to the left rear mounting portion 34. A rear mounting part 16b of the left suspension arm 16 is held between the left rear connection portion 64 and the left rear attachment cover 45, and the left rear attachment cover 45 (see also FIG. 1) is fixed to the left rear connection portion 64 via bolts 46, 48. The rear mounting part 16h of the left suspension arm 16 is thus connected to the left rear connection portion 64.

In this manner, the front mounting part 16a of the left suspension arm 16 is connected to the left front connection portion 63 and the rear mounting part 16b of the left suspension arm 16 is connected to the left rear connection portion 64, whereby the left suspension arm 16 is connected to the left suspension support part 27.

A left suspension (not shown) is connected at a lower end to the left suspension arm 16 and, at an upper end, to the vehicle body 11. The left suspension is thus supported by the left suspension arm 16. In this manner, the left suspension is supported by the left suspension support part 27 via the left suspension arm 16. A knuckle is provided to a distal end 16c of the left suspension arm 16 via a knuckle bolt 79, and the left front wheel 18 is supported by the knuckle.

Similarly to the left suspension support part 27, the right suspension support part 29 includes a right front connection portion 73 formed integrally with the front section 25f of the right end 25b of the hollow body 25, and a right rear connection portion 74 formed integrally with the rear section 25g of the right end 25b of the hollow body 25.

In the right suspension support part 29, similarly to the left suspension support part 27, a front mounting part 17a of the right suspension arm 17 is connected to the right front connection portion 73 and a rear mounting part 17h of the right suspension arm 17 is connected to the right rear connection portion 74. The right suspension arm 17 is thus connected to the right suspension support part 29.

The central connection part 31 is located at a center of the hollow body 25 in the vehicle width direction and on a front part of the hollow body 25 in the vehicle longitudinal direction. A base end 22a (FIG. 1) of the torque rod 22 is fixedly connected to the central connection part 31 via a bolt 76. A distal end 22b of the torque rod 22 is fixedly connected to the power plant 21 via a bolt 77. The power plant 21 is thus supported by the torque rod 22.

As noted above, the sub-frame 15 (more specifically the hollow body 25) has the front upper inclined part 57 in the top wall 52, and the bulging amount of the sub-frame 15 in the direction obliquely forward and upward is thereby reduced. With this configuration, as shown in FIG. 2, a rear part of the power plant 21 is housed within the front upper space 61a formed in the engine room 61 on the front upper side of the sub-frame 15.

The sub-frame 15 is formed of aluminum alloy by high-pressure die casting as shown in FIG. 5. When the sub-frame 15 is formed by high-pressure die casting, dies for casting (i.e., a fixed die and a movable die) meet together at a parting line (i.e., junction section) and are clamped. With the parting line formed by the dies, a trace 81 of the parting line or parting line trace 81 (see also FIG. 1) is formed on the sub-frame 15 at a position corresponding to the parting line.

The following is a detailed description of the hollow body 25 of the sub-frame 15. The parting line trace 81 is formed over all a peripheral wall (including the front wall 54, the rear wall 55, and left and right side walls) of the sub-frame 15. In this configuration, flows of molten metal poured or injected from a first parting line section corresponding to one of the front and rear walls 54, 55 reach a second parting line section corresponding to the other one of the front and rear walls 54, 55 at the same time.

More specifically, the parting line trace 81 includes a front junction trace 82 formed on the front wall 54 at a position 54a adjacent to a lower end thereof, and a rear junction trace 83 formed on the rear wall 55 at a vertically central position 55a. The front junction trace 82 extends in the vehicle width direction at the position 54a adjacent to the lower end of the front wall 54 (see also FIG. 1). The rear junction trace 83 extends in the vehicle width direction at the vertically central position 55a of the rear wall 55.

Figure 6:
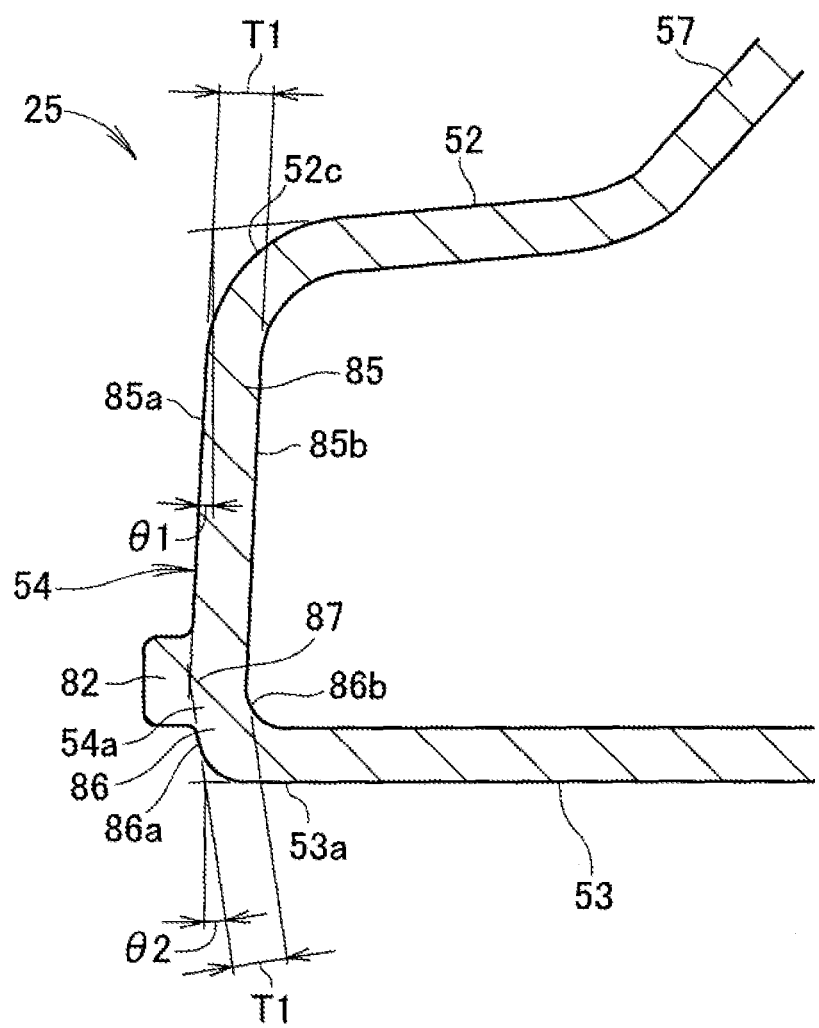
FIG. 6 is an enlarged view of section 6 of FIG. 5.

As shown in FIG. 6, the front wall 54 has a front wall upper section 85 extending downward from the front end 52c of the top wall 52, a front wall lower section 86 extending upward from the front end 53a of the bottom wall 53, a front bulging section 87 formed at a junction (merging section) between the front wall upper section 85 and the front wall lower section 86, and the front junction trace 82 formed on the front bulging section 87.

The front wall upper section 85 extends downward from the front end 52c of the top wall 52 at a forward inclination angle. An outer surface 85a of the front wall upper section 85 is formed at the forward inclination angle θ1, and an inner surface 85b of the front wall upper section 85 is formed parallel to the outer surface 85a. The front wall upper section 85 has a thickness T1.

The front wall lower section 86 extends upward from the front end 53a of the bottom wall 53 at a forward inclination angle. An outer surface 86a of the front wall lower section 86 is formed at the inclination angle θ2, and an inner surface 86b of the front wall lower section 86 is formed parallel to the outer surface 86a. The front wall lower section 86 has a thickness T1. That is, the front wall upper section 85 and the front wall lower section 86 of the front wall 54 are uniformly formed to have the same thickness T1.

The front bulging section 87 is formed at the junction (merging section) between the front wall upper section 85 and the front wall lower section 86 to bulge forward (outward) than the front end 52c of the top wall 52 and the front end 53a of the bottom wall 53. Further, the front bulging section 87 is located on a part (at a vertically intermediate position of the front wall 54, more specifically, the position 54a adjacent to the lower end of the front wall 54) avoiding in the vertical direction the front end 52c of the top wall 52 and the front end 53a of the bottom wall 53.

The front junction trace 82 is a rib-shaped portion projecting forward from the front bulging section 87 and extending in the vehicle width direction.

Figure 7:
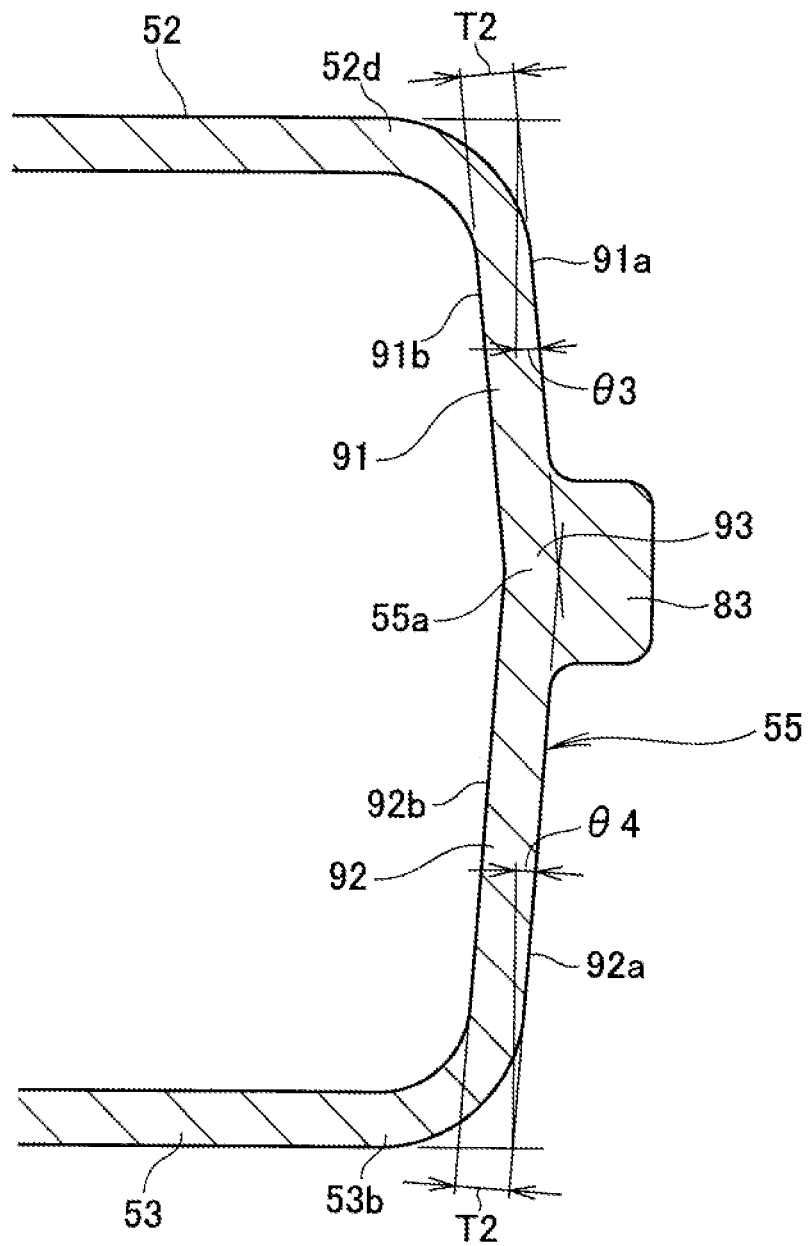
FIG. 7 is an enlarged view of section 7 of FIG. 5.

As shown in FIG. 7, the rear wall 55 has a rear wall upper section 91 extending downward from the rear end 52d of the top wall 52, a rear wall lower section 92 extending upward from the rear end 53b of the bottom wall 53, a rear bulging section 93 formed at a junction (merging section) between the rear will upper section 91 and the rear wall lower section 92, and the rear junction trace 83 formed on the rear bulging section 93.

The rear wall upper section 91 extends downward from the rear end 52d of the top wall 52 at a rearward inclination angle. An outer surface 91.a of the rear wall upper section 91 is formed at the rearward inclination angle θ3, and an inner surface 91b of the rear wall upper section 91 is formed parallel to the outer surface 91a. The rear wall upper section 91 has a thickness T2.

The rear wall lower section 92 extends upward from the rear end 53b of the bottom wall 53 at a rearward inclination angle. An outer surface 92a of the rear wall lower section 92 is formed at the rearward inclination angle θ4, and an inner surface 92b of the rear wall lower section 92 is formed parallel to the outer surface 92a. The rear wall lower section 92 has a thickness T2. That is the rear wall upper section 91 and the rear wall lower section 92 of the rear wall 55 are uniformly formed to have the same thickness T2.

The rear bulging section 93 is formed at the junction (merging section) between the rear wall upper section 91 and the rear wall lower section 92 to bulge rearward (outward) than the rear end 52d of the top wall 52 and the rear end 53b of the bottom wall 53. Further, the rear bulging section 93 is located on a part (at a vertically intermediate position of the rear wall 55, more specifically, the vertically central position 55a of the rear wall 55) avoiding in the vertical direction the rear end 52d of the top wall 52 and the rear end 53b of the bottom wall 53.

The rear junction trace 83 is a rib-shaped portion projecting rearward from the rear bulging section 93 and extending in the vehicle width direction.

Figure 8:
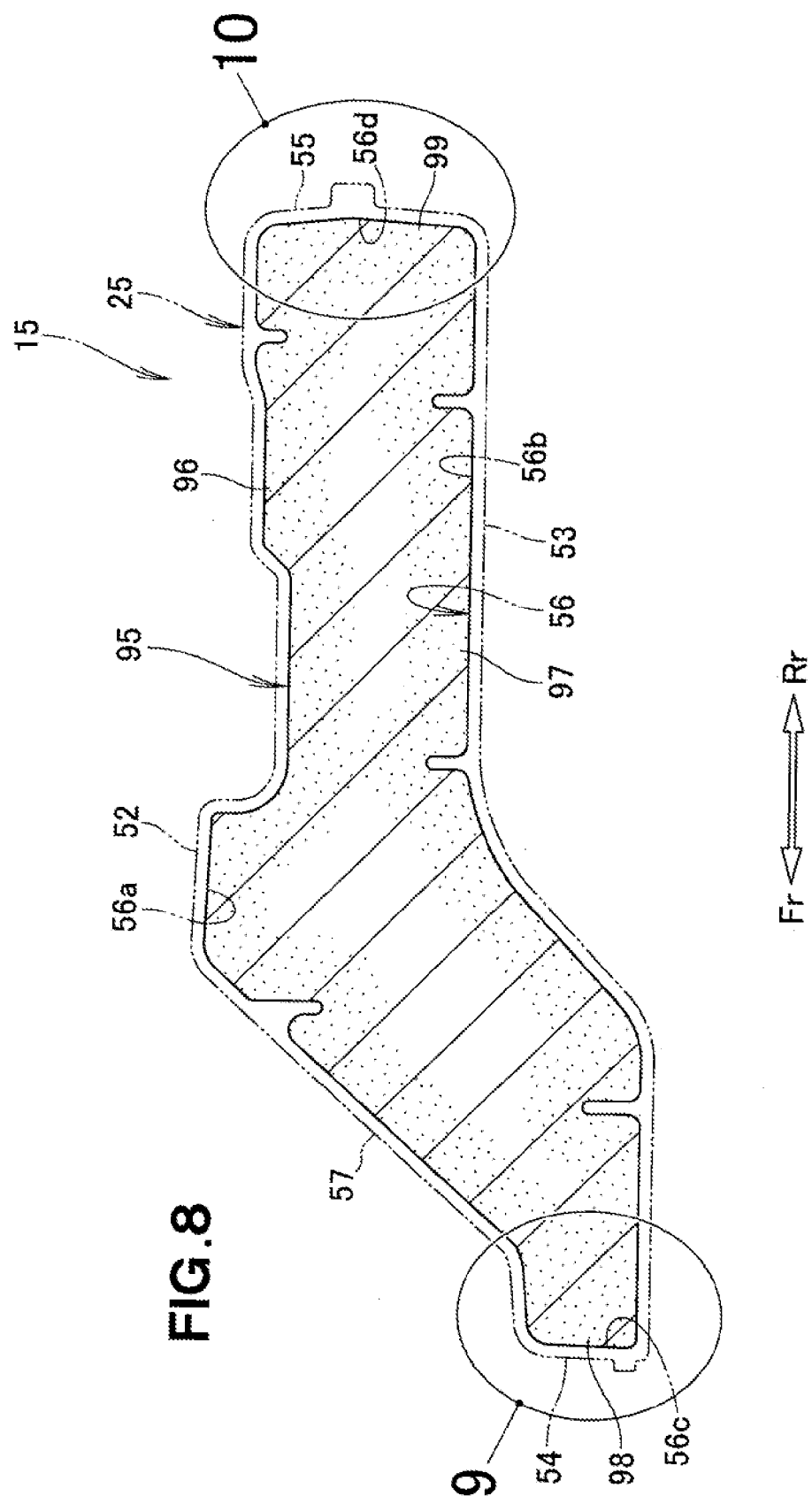
FIG. 8 is a vertical cross-sectional view of a core used for casting the sub-frame according to the present invention.

Next will be described the core 95 used for casting the sub-frame 15 with reference to FIGS. 8 to 10. The core 95 is formed by solidifying casting sand with a binder, and used to form an inner surface 56 of the hollow body 25, as shown in FIG. 8. The inner surface 56 of the hollow body 25 includes an inner surface 56a of the top wall 52, an inner surface 56b of the bottom wall 53, an inner surface 56c of the front wall 54, and an inner surface 56d of the rear wall 55.

The core 95 has a core top surface 96 corresponding to the inner surface 56a of the top wall 52, a core bottom surface 97 corresponding to the inner surface 56b of the bottom wall 53, a core front surface 98 corresponding to the inner surface 56c of the front wall 54, a core rear surface 99 corresponding to the inner surface 56d of the rear wall 55.

Figure 9:
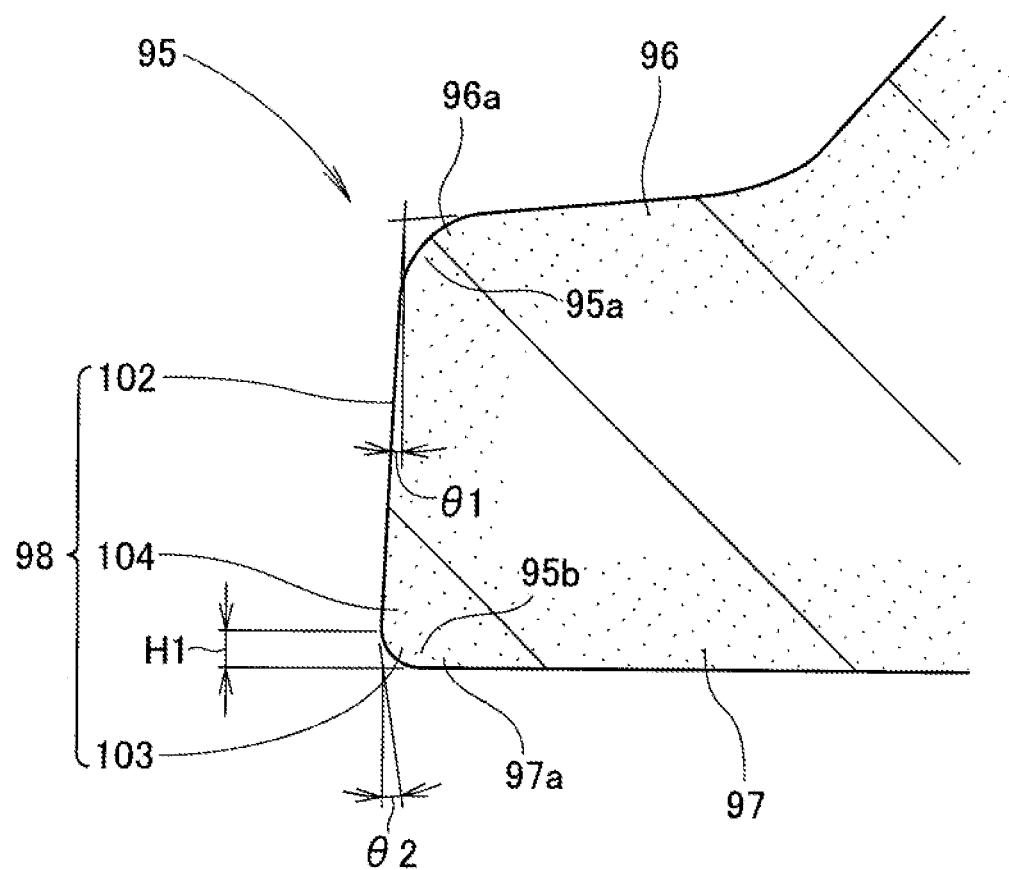
FIG. 9 is an enlarged view of section 9 of FIG. 8.

As shown in FIG. 9, the core front surface 98 has a core front surface upper section 102 extending downward from a front end 96a of the core top surface 96, a core front surface lower section 103 extending upward from a front end 97a of the core bottom surface 97, and a core front bulging section 104 formed at a junction (merging section) between the core front surface upper section 102 and the core front surface lower section 103.

As shown in FIGS. 6 and 9, the core front surface upper section 102 extends downward from the front end 96a of the core top surface 96 at a forward inclination angle. The core front surface upper section 102 is formed at the forward inclination angle θ1 that is the same as the angle of the outer surface 85a of the front wall upper section 85. The core front surface lower section 103 extends upward from the front end 97a of the core bottom surface 97 at a forward inclination angle. The core front surface lower section 103 is formed at the forward inclination angle θ2 that is the same as the angle of the outer surface 86a of the front wall lower section 86.

The core front bulging section 104 is formed at the junction (merging section) between the core front surface upper section 102 and the core front surface lower section 103 to bulge forward (outward) than the front end 96a of the core top surface 96 and the front end 97a of the core bottom surface 97. A crossing angle between the core front surface upper section 102 and the core front surface lower section 103 is an obtuse angle.

The core front bulging section 104 is located at a position corresponding to the front bulging section 87. As noted above, the front bulging section 87 is located on the part (at the vertically intermediate position of the front wall 54, more specifically, the position 54a adjacent to the lower end of the front wall 54) avoiding the front end 52c of the top wall 52 and the front end 53a of the bottom wall 53.

Thus, the core front bulging section 104 is located on a part (at a vertically intermediate position of the core front surface 98) avoiding the front end 96a of the core top surface 96 and the front end 97a of the core bottom surface 97. The vertically intermediate position of the core front surface 98 is located upward from the front end 97a of the core bottom surface 97 by a height H1. By thus forming the core front bulging section 104 at the vertically intermediate position of the core front surface 98, acute angle parts can be removed from a merging section (front upper angle section) 95a between the core front surface 98 and the core top surface 96, and a merging section (front lower angle section) 95b between the core front surface 98 and the core bottom surface 97.

Further, with the core front bulging section 104 formed at the position corresponding to the front bulging section 87, an inner face of the front bulging section 87 is formed to be recessed outward, whereby the front wall 54 of the hollow body 25 can be formed to have the constant thickness T1.

Figure 10:
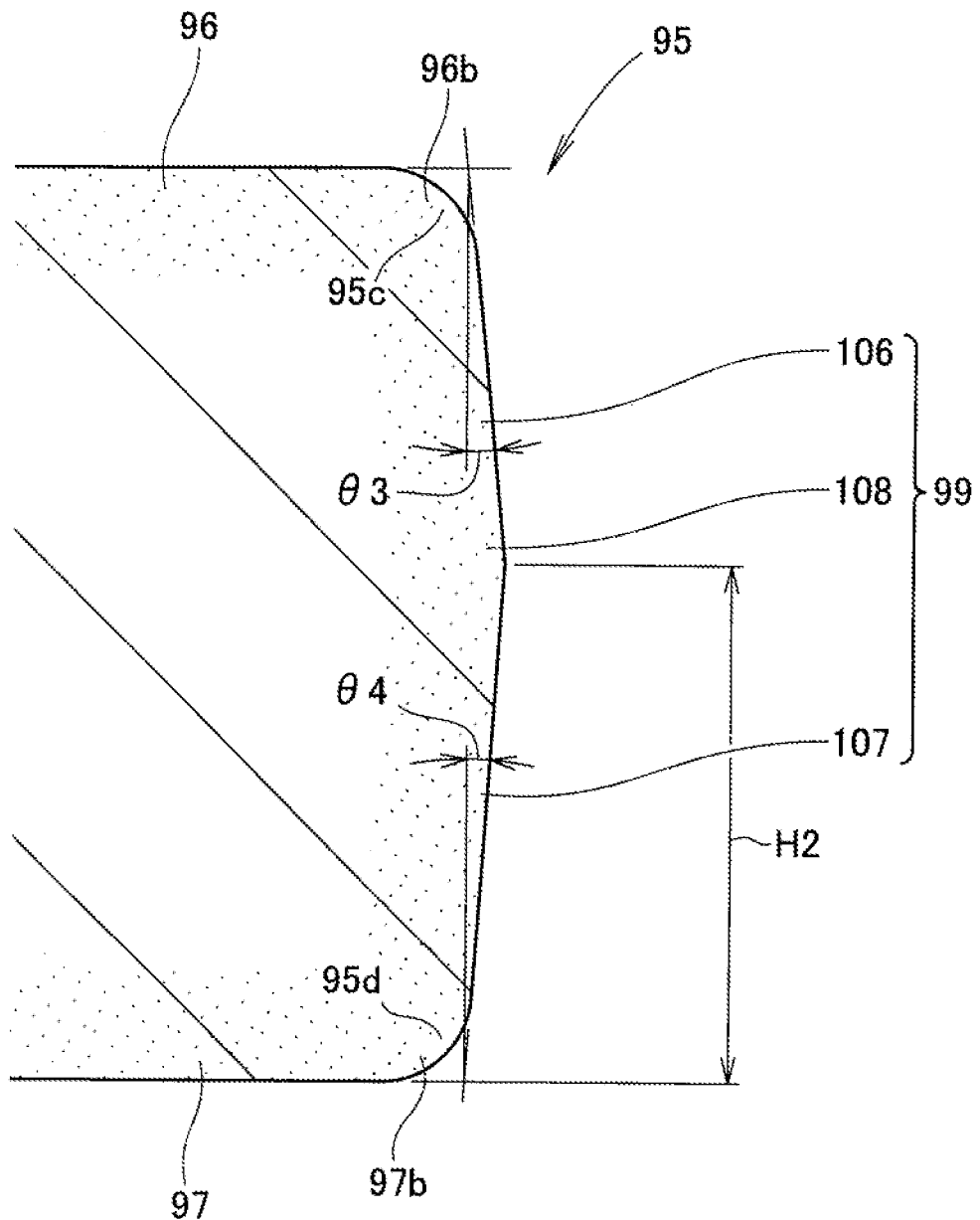
FIG. 10 is an enlarged view of section 10 of FIG. 8.

As shown in FIG. 10, the core rear surface 99 has a core rear surface upper section 106 extending downward from a rear end 96b of the core top surface 96, a core rear surface lower section 107 extending upward from a rear end 97b of the core bottom surface 97, and a core rear bulging section 108 formed at a junction (merging section) between the core rear surface upper section 106 and the core rear surface lower section 107.

As shown in FIGS. 7 and 10, the core rear surface upper section 106 extends downward from the rear end 96b of the core top surface 96 at a rearward inclination angle. The core rear surface upper section 106 is formed at the rearward inclination angle θ3 that is the same as the angle of the outer surface 91a of the rear wall upper section 91. The core rear surface lower section 107 extends upward from the rear end 97b of the core bottom surface 97 at a rearward inclination angle. The core rear surface lower section 107 is formed at the rearward inclination angle θ4 that is the same as the angle of the outer surface 92a of the rear wall lower section 92.

The core rear bulging section 108 is formed at the junction (merging section) between the core rear surface upper section 106 and the core rear surface lower section 107 to bulge rearward (outward) than the rear end 96b of the core top surface 96 and the rear end 97b of the core bottom surface 97. A crossing angle between the core rear surface upper section 106 and the core rear surface lower section 107 is an obtuse angle.

The core rear bulging section 108 is located at a position corresponding to the rear bulging section 93. As noted above, the rear bulging section 93 is located on the part (at the vertically intermediate position of the rear wall 55, more specifically, the vertically central position 55a of the rear wall 55) avoiding the rear end 52d of the top wall 52 and the rear end 53b of the bottom wall 53. Thus, the core rear bulging section 108 is located on a part (at a vertically intermediate position of the core rear surface 99) avoiding the rear end 9613 of the core top surface 96 and the rear end 97b of the core bottom surface 97. The vertically intermediate position of the core rear surface 99 is located upward from the rear end 97b of the core bottom surface 97 by a height H2. By thus forming the core rear bulging section 108 at the vertically intermediate position of the core rear surface 99, acute angle parts can be removed from a merging section (rear upper angle section) 95c between the core rear surface 99 and the core top surface 96, and a merging section (rear lower angle section) 95d between the core rear surface 99 and the core bottom surface 97.

Further, with the core rear bulging section 108 formed at the position corresponding to the rear bulging section 93, an inner face of the rear bulging section 93 is formed to be recessed outward, whereby the rear wall 55 of the hollow body 25 can be formed to have the constant thickness T2.

As shown in FIGS. 9 and 10, the core front surface 98, the front upper angle section 95a, the front lower angle section 95b, the core rear surface 99, the rear upper angle section 95c, and the rear lower angle section 95d are formed with no acute angle parts. Thus, breakage of the angle sections 95a to 95d of the core 95 can be prevented, thereby securing strength of the core 95.

Further, as shown in FIGS. 6 and 7, with the core front bulging section 104 (FIG. 9) formed at the position corresponding to the front bulging section 87, the front wall 54 of the hollow body 25 can be formed to have the constant thickness T1. Also, with the core rear bulging section 108 (FIG. 10) formed at the position corresponding to the rear bulging section 93, the rear wall 55 of the hollow body 25 can be formed to have the constant thickness T2. By thus forming the front wall 54 and the rear wall 55 with the constant thicknesses, an increase in weight of the hollow body 25 (i.e., sub-frame 15) can be suppressed.

Below will be described how the sub-frame 15 is formed by high-pressure die casting using a die unit 111 and the core 95 with reference to FIGS. 5, 11A and 11B. First, will be described with reference to FIGS. 5 and 11A a case where molten metal is poured or injected from a rear parting line section 114b constituting a rear part of the parting line 114 of the die unit 111.

Figure 11A:
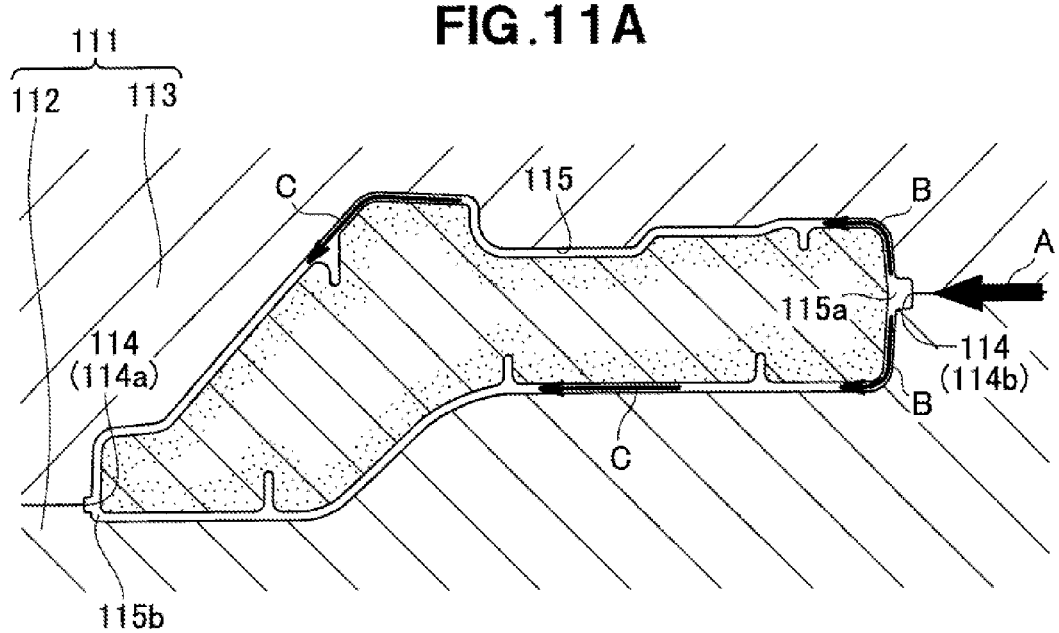
FIG. 11A is a view illustrative of the manner in which molten metal is poured or injected from a rear parting line section for casting the sub-frame.

As shown in FIG. 11A, a fixed die 112 and a movable die 113 constituting the die unit 111 meet together and are clamped, whereby the parting line (junction section) 114 is formed.

As noted above, the sub-frame 15 (hollow body 25) has the front upper inclined part 57 at the front part of the top wall 52 as shown in FIG. 5. Therefore, as shown in FIG. 11A, a front parting line section 114a constituting a front part of the parting line 114 on a side of the front upper inclined part 57 (FIG. 5) must be arranged below the front upper inclined part 57.

The parting line 114 of the die unit 111 is formed at a position corresponding to the parting line trace 81. In other words, the parting line 114 is formed over all a part corresponding to the peripheral wall (including the front wall 54, the rear wall 55, and the left and right side walls) of the sub-frame 15. Further, by clamping the die unit 111, a cavity 115 is formed between the the unit 111 and the core 95. The cavity 115 includes a rear cavity section 115a formed on a part corresponding to the rear wall 55 of the hollow body 25.

In a state where the die unit 111, i.e. the fixed die 112 and the movable die 113 are clamped, molten metal of aluminum alloy is poured or injected from the rear cavity section 115a (rear parting line section 114b) as indicated by arrow A. The rear parting line section (first parting line section) 114b of the parting line 114 of the die unit 111 is located at a position corresponding to the vertically central position 55a (FIG. 5) of the rear wall 55. The rear parting line section 114b is thus located at a vertically central position of the rear cavity section 115a.

With this configuration, the molten metal injected from the rear cavity section 115a can be guided evenly upward and downward from the vertically central position of the rear cavity section 115a as indicated by arrows B. The molten metal guided evenly upward and downward from the vertically central position of the rear cavity section 115a then flows as indicated by arrows C to fill the entire cavity 115 with good efficiency.

As noted above, the parting line 114 is formed over all the part corresponding to the peripheral wall (including the front wall 54, the rear wall 55, and the left and right side walls) of the sub-frame 15. The molten metal injected from the rear cavity section 115a can therefore be guided to flow through regions corresponding to the left and right side walls of the sub-frame 15 with good efficiency. As a result, flows of the molten metal injected from the rear cavity section 115a can reach a front cavity section 115b (front parting line section 114a) at the same time.

Since the flows of the molten metal reach the front cavity section 115b at the same time, it is possible to prevent a backflow of the molten metal from the front cavity section 115b (front parting line section 114a). By thus preventing the backflow of the molten metal, the sub-frame 15 can be prevented from containing impurities, thereby improving quality of the sub-frame 15.

The case has been described where molten metal is poured or injected from the rear parting line section 114b as shown in FIG. 11A, however, the present invention is not so limited, and molten metal may be poured or injected from the front parting line section 114a. Next will be described with reference to FIG. 11B a case where molten metal is injected from the front parting line section 114a.

Figure 11B:
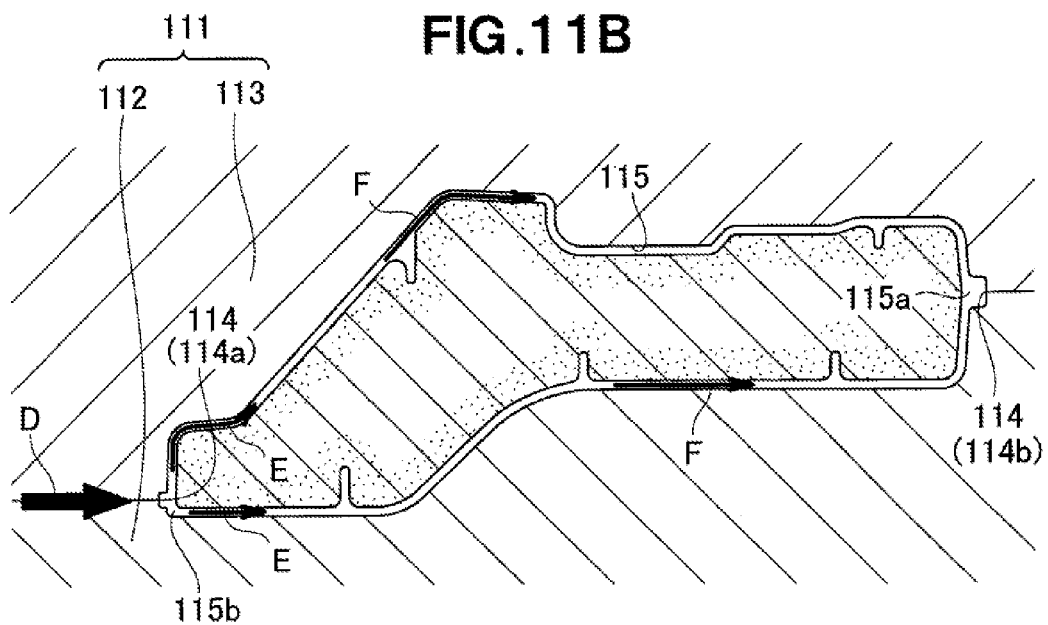
FIG. 11B is a view illustrative of the manner in which molten metal is poured or injected from a front parting line section for casting the sub-frame.

As shown in FIG. 11B, in a state where the die unit 111, i.e. the fixed die 112 and the movable the 113 are clamped, molten-metal of aluminum alloy is injected from the front cavity section 115b (front parting line section 114a) as indicated by arrow D. The molten metal injected from the front cavity section 115b is guided evenly upward and downward from the front cavity section 115b as indicated by arrows E. The molten metal guided upward and downward from the front cavity section 115b then flows as indicated by arrows F to fill the entire cavity 115 with good efficiency.

As noted above, the parting line 114 is formed over all the part corresponding to the peripheral wall (including the front wall 54, the rear wall 55, and the left and right side walls) of the sub-frame 15. The molten metal injected from the front cavity section 115b can therefore be guided to flow through regions corresponding to the left and right side walls of the sub-frame 15 with good efficiency. As a result, flows of the molten metal injected from the front cavity section 115b can reach the rear cavity section 115a (rear parting line section 114b) at the same time.

Since the flows of the molten metal reach the rear cavity section 115a at the same time, it is possible to prevent a backflow of the molten metal from the rear cavity section 115a (rear parting line section 114b). By thus preventing the backflow of the molten metal, the sub-frame 15 can be prevented from containing impurities, thereby improving quality of the sub-frame 15.

Note that the vehicle sub-frame according to the present invention is not limited to the above-described embodiment, and various minor changes and modifications of the present invention are possible in light of the above teaching. For example, the embodiment has been explained in the case where the sub-frame 15 is provided in a front part of the vehicle body 11, however, it is not so limited, and the present invention may be applied to a sub-frame provided in a rear part of the vehicle body 11.

Further, although in the embodiment the front upper inclined part 57 is formed to extend upwardly from the front end 52a to the middle section 52b of the top wall 52, it is not so limited, and the front upper inclined part 57 may be formed to extend from the front end 52a to a position located forward or rearward of the middle section 52b.

Furthermore, the shapes and configurations of the vehicle front structure, the hollow body, the left and right suspension support parts, the hollow part, the top wall, the bottom wall, the front wall, the rear wall, the front and rear bulging sections, the core, the core front and rear bulging section, the parting line, etc. are not limited to those illustratively shown and described herein, and they may be modified as necessary.

What is claimed is:

1. A vehicle sub-frame comprising:
   a hollow body extending in a vehicle width direction and having a hollow part thereinside formed by casting using a core; and
   left and right suspension support parts formed integrally with left and right ends of the hollow body, respectively, for connection with suspension arms, wherein the hollow body includes a front wall located on a front side in a vehicle body, and a rear wall located rearward of the front wall, wherein the front wall and the rear wall have respective bulging sections each formed to bulge outward at a position corresponding to a parting line formed in casting of the sub-frame, and wherein each of the bulging sections is located on a part avoiding a top part of the hollow body and a bottom part of the hollow body.

2. The vehicle sub-frame of claim 1, wherein the core has core bulging sections located at positions corresponding to the bulging sections and formed to bulge outward.

3. The vehicle sub-frame of claim 1, wherein a trace of the parting line is formed on the sub-frame during casting of the sub-frame, the parting line being designed so that flows of molten metal injected from a first parting line section corresponding to one of the front and rear walls reach a second parting line section corresponding to the other one of the front and rear walls at the same time.

4. A die-cast vehicle sub-frame comprising:

a hollow body having a first end and an opposite, second end; and a pair of suspension support parts formed integrally with the first and second ends of the hollow body, respectively, for connection with suspension arms of a vehicle, wherein the hollow body includes a front wall, a rear wall, a top wall connecting upper ends of the front wall and the rear wall, and a bottom wall connecting lower ends of the front wall and the rear wall, wherein each of the front wall and the rear wall has a trace of a parting line formed on an outer surface thereof and located at a vertically intermediate position of the front or rear wall, and wherein each of the front wall and the rear wall has a wall upper section extending downward from the top wall at a first obtuse angle, and a wall lower section extending upward from the bottom wall at a second obtuse angle, the wall upper section and the wall lower section merging together at the trace of the parting line.

5. The die-cast vehicle sub-frame of claim 4, wherein the wall upper section and the wall lower section have the same thickness.

6. The die-cast vehicle sub-frame of claim 4, wherein a corner edge between the top wall and the wall upper section is rounded, and a corner edge between the bottom wall and the wall lower section is rounded.

* * * * *